Jan. 29, 1924.

H. A. MOOMJIAN

ICE CREAM SANDWICH MAKING MACHINE

Filed Jan. 5, 1921 7 Sheets-Sheet 1

1,482,138

Jan. 29, 1924.  1,482,138
H. A. MOOMJIAN
ICE CREAM SANDWICH MAKING MACHINE
Filed Jan. 5, 1921  7 Sheets-Sheet 2

Jan. 29, 1924.  
H. A. MOOMJIAN  
ICE CREAM SANDWICH MAKING MACHINE  
Filed Jan. 5, 1921  
1,482,138  
7 Sheets-Sheet 5
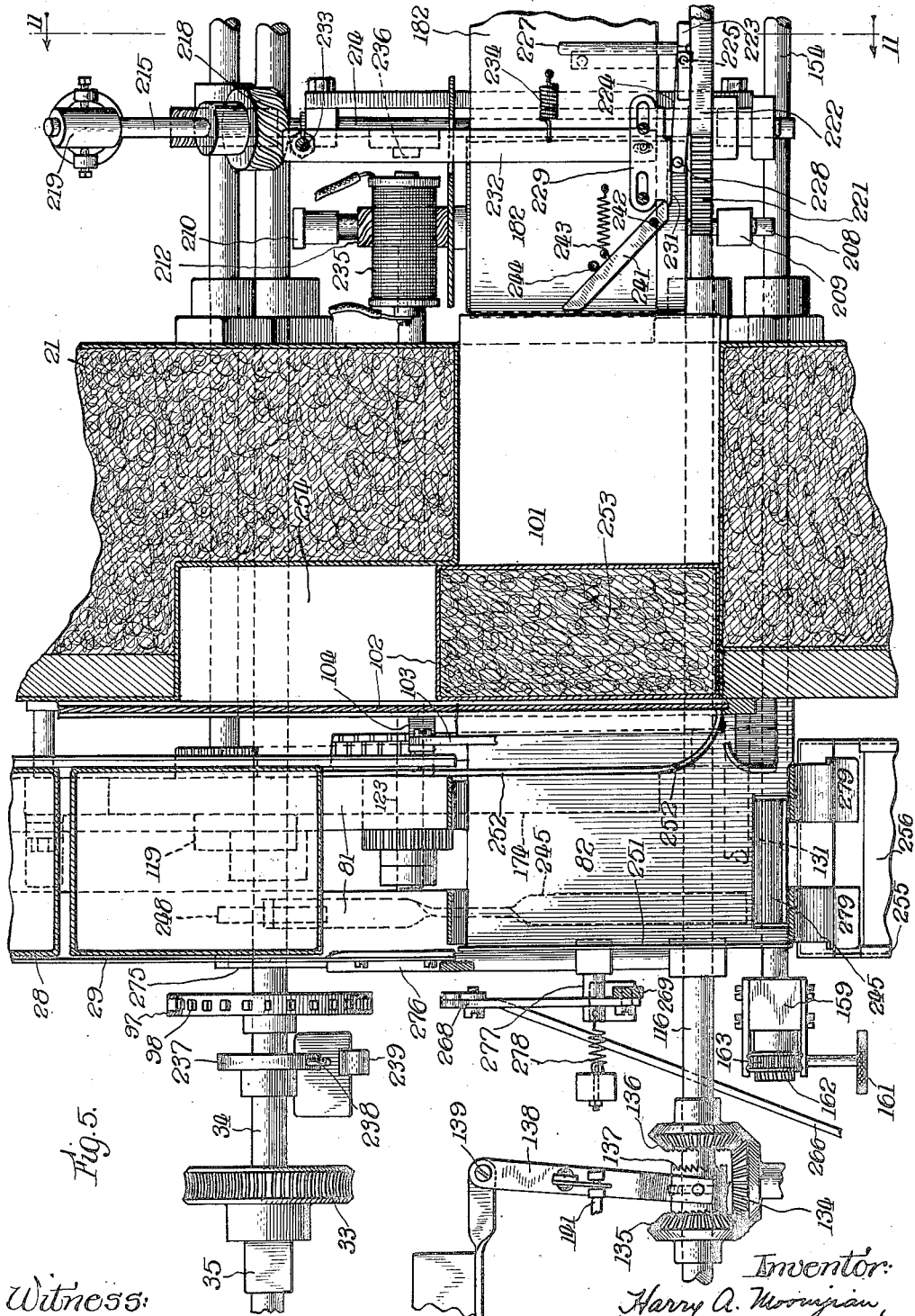
Fig. 5.
Witness:
C. J. Samser.

Jan. 29, 1924.  
H. A. MOOMJIAN  
ICE CREAM SANDWICH MAKING MACHINE  
Filed Jan. 5, 1921  
1,482,138  
7 Sheets-Sheet 6
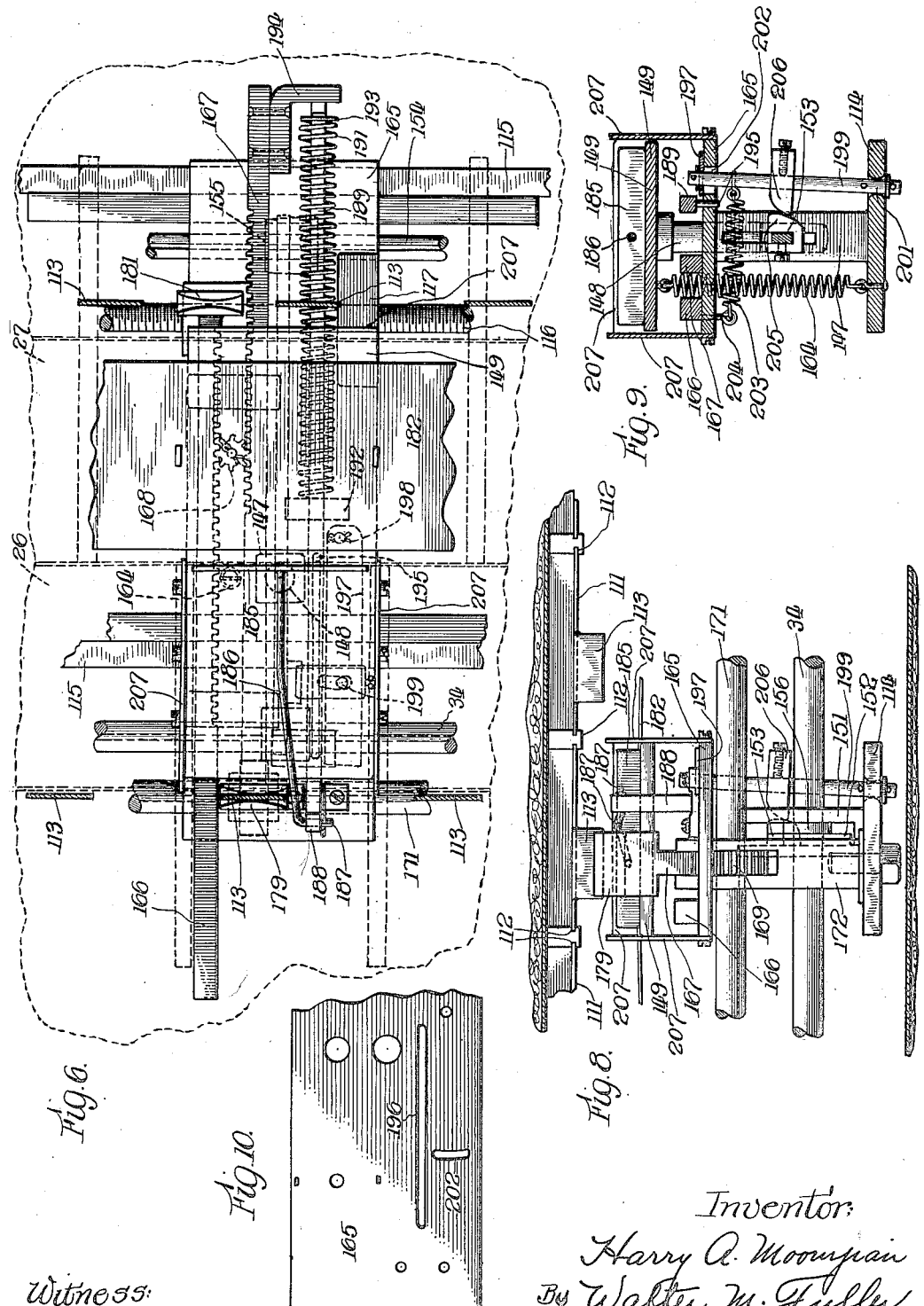
Witness:  
A. J. Sauser.
Inventor:  
Harry A. Moomjian  
By Walter M. Fuller  
Atty.

Jan. 29, 1924.
H. A. MOOMJIAN
1,482,138
ICE CREAM SANDWICH MAKING MACHINE
Filed Jan. 5, 1921   7 Sheets-Sheet 7
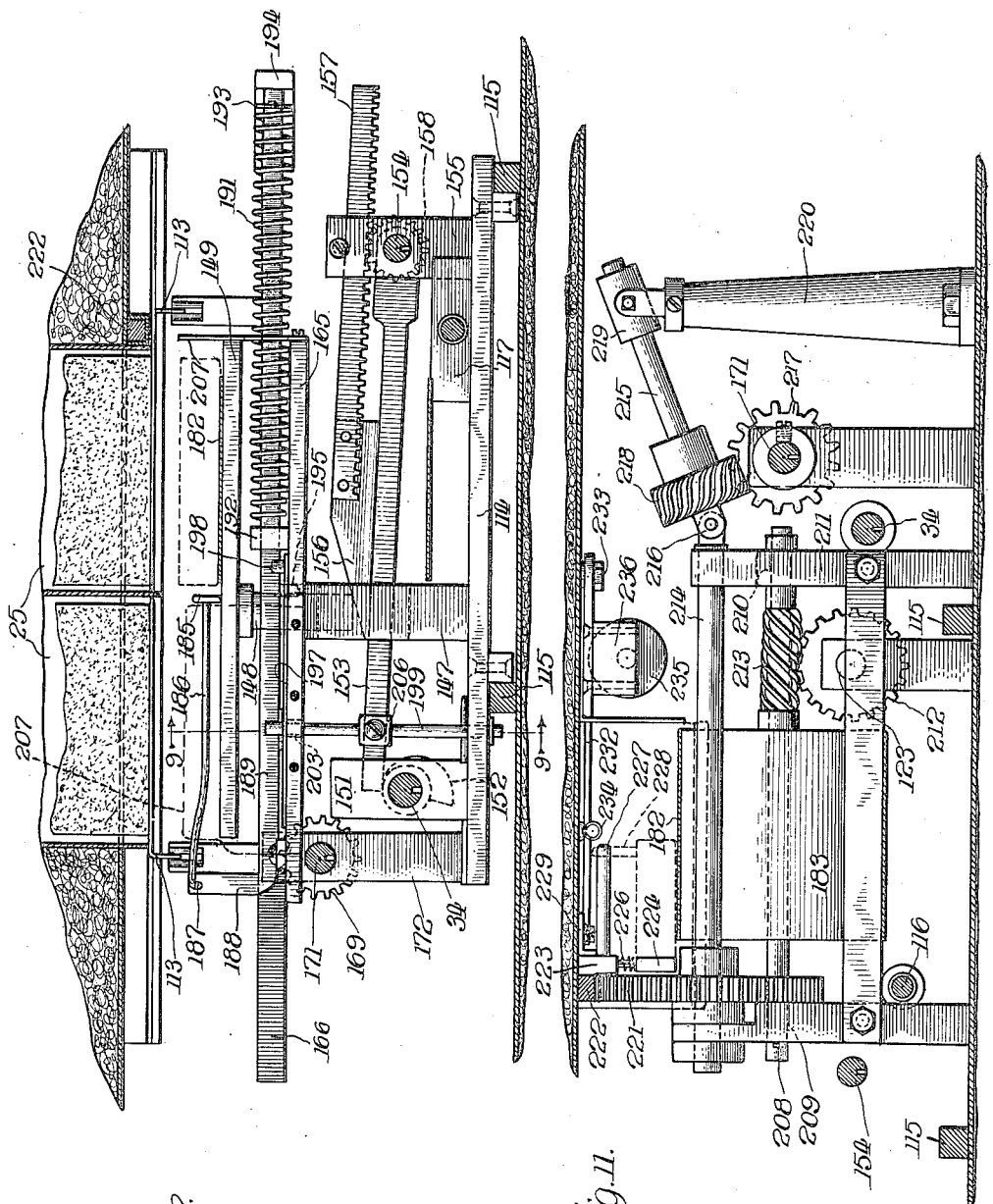
Witness:
A. J. Sauser.
Inventor:
Harry A. Moomjian
By Walter M. Fuller
Atty.

Patented Jan. 29, 1924.

1,482,138

UNITED STATES PATENT OFFICE.

HARRY A. MOOMJIAN, OF CHICAGO, ILLINOIS.

ICE-CREAM-SANDWICH-MAKING MACHINE.

Application filed January 5, 1921. Serial No. 435,064.

*To all whom it may concern:*

Be it known that I, HARRY A. MOOMJIAN, a citizen of the United States, residing at Chicago, in the county of Cook and State of Illinois, have invented certain new and useful Improvements in Ice-Cream-Sandwich-Making Machines, of which the following is a specification.

The present invention concerns sandwich making and similar machines but pertains more especially or more particularly to mechanisms for assembling elements of ice cream or similar sandwiches and delivering them in envelopes, bags, or other containers.

The salient characteristic and chief purpose of the invention is the production of a machine of this type of comparatively simple structure which will operate with efficiency and reliability and without substantial danger of improper action or likelihood of damage or injury to its various cooperating instrumentalities.

In the present embodiment of the invention the machine is provided with a plurality of supplies of ice cream as well as a multiplicity of magazines or wafers, and the machine is equipped with means for drawing upon such plurality of supplies in succession in the production of the sandwiches, whereby all the supplies will become exhausted at practically or nearly the same time.

Other features of the invention reside in the provision of means for conserving the cooling action of the ice, means for securing proper register or alignment of the parts of the sandwich, and means for opening up the paper envelope or bag preliminary to the introduction of the sandwich, as well as means for advancing the stack of envelopes or other containers to compensate for the removal of the used ones.

To the accomplishment of these and other desirable ends, I have provided the preferred embodiment of the invention illustrated in detail in the accompanying drawings, forming a part of this specification, and throughout the several views of which like reference characters refer to the same parts. Those skilled in this art will readily understand the structural and functional advantages accruing from the employment of such a device, a complete description of the construction and operation of which follows.

In these drawings:

Figure 5 is an enlarged plan view of certain portions of the operating mechanism of the appliance, a part of such mechanism being outside of the refrigerator, another portion inside of the same;

Figure 6 is a fragmentary plan view of the means employed for shaving off the slices of ice cream from the supplies;

Figure 7 is an elevation of the structure shown in Figure 6;

Figure 8 is an end view of the mechanism illustrated in Figures 6 and 7;

Figure 9 is a detail vertical section on line 9—9 of Figure 7;

Figure 10 is a detail plan view of a portion of the carriage which receives the slab of ice cream; and Figure 11 is a vertical section on line 11—11 of Figure 5.

Figure 1:
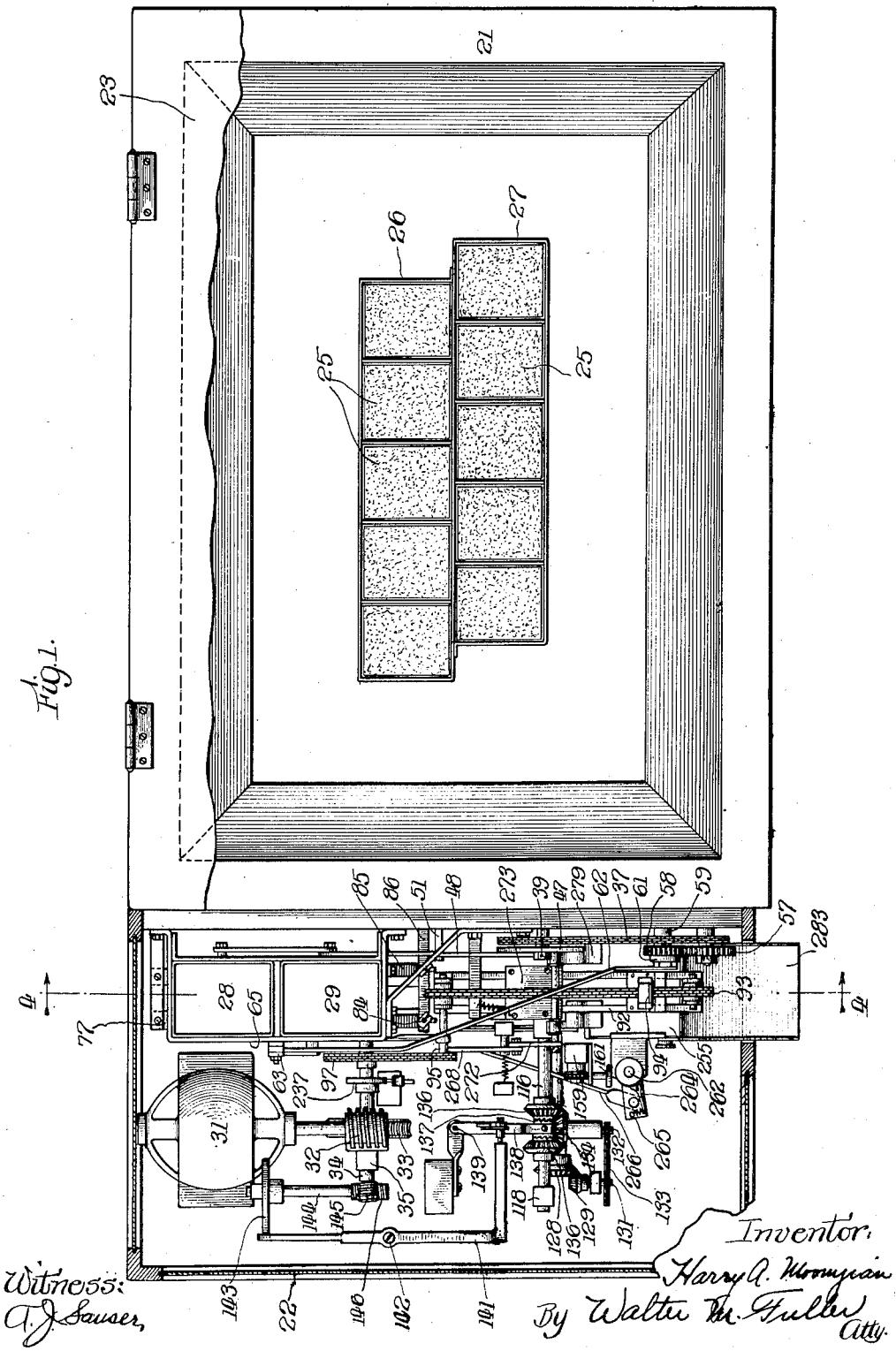
Figure 1 is a plan view of the complete appliance with certain parts of the refrigerator and the enclosing casing broken away.

Referring to these drawings, it will be observed that the improved appliance includes two main portions, one characterized 21 constituting a heat-insulated, ice-packed, ice-cream container or compartment, and the other 22 a housing or casing enclosing more or less of the mechanism for assembling the elements of the sandwich, inserting them in envelopes or bags, and delivering them from the appliance. The refrigerator may be of any convenient and appropriate construction, but it is desirably provided with a hinged cover 23 and openings 24 in its opposite side walls adapted to be closed by suitable doors or closures, not shown. Such refrigerator internally accommodates a plurality of ice cream chambers or compartments 25, 25 arranged in two rows 26 and 27 with their containers in offset relation, as is clearly shown in Figure 1. The ice cream chambers of these two rows are desirably displaced with relation to one another one-half the width of each can to facilitate the ice cream shaving operation, it being understood that the slabs or layers of ice cream are shaved or cut off from the bottom of the bodies of ice cream contained in such compartments.

Shell or casing 22 among other things encloses two upright compartments, made out of sheet-metal for example, 28 and 29, adapted to house the supplies of wafers employed in the production of ice cream sandwiches, each of the latter comprising a bottom wafer, an intermediate layer of ice cream, and a top wafer.

Referring first to the means for feeding the wafers from the supply cans to the assembly platform on which the parts of the sandwich are brought together and assembled, it is to be borne in mind that the mechanism may be actuated from any suitable source of power controlled or governed by any appropriate means, for example, the driving means may constitute an electric motor and the governor or controller may conveniently take the form of a coin controlled apparatus governing the actuation of such motor.

Such an electric motor 31, by means of a worm 32 driven thereby, rotates a worm wheel 33 and its shaft 34 revoluble in suitable bearings including one characterized 35, Figure 5. Such drive shaft is equipped with a sprocket wheel 36 which actuates a cooperating sprocket chain 37 (Figures 3 and 4) which passes around a sprocket wheel 38 on a suitably mounted revoluble shaft 39 supported in any approved manner and around another sprocket wheel 41 on a properly mounted revoluble shaft 42, around a third sprocket wheel 43 on a similarly supported shaft 44, through a spring actuated chain tightener 45, and around an idler 46.

By these means the rotation of the power driven shaft 34 is transmitted to the three shafts 39, 42 and 44.

Shaft 39 is employed to raise and lower the wafer cans 28 and 29 so as to shift them out of and into cooperative relation with the wafer feeder, whereby the wafers may be removed from the two cans and thus deplete their supplies substantially uniformly.

Shaft 42 is employed for the purpose of operating such wafer feeder, whereas shaft 44 is used to open and close the door in the refrigerator wall through the doorway of which the slab of ice cream is delivered at the proper time.

Referring now more specifically to the mechanism for raising and lowering the wafer cans, it will be observed that shaft 39 is equipped with a cam 47 with the irregular edge of which rollers on the ends of two levers 48 and 49 cooperate.

Lever 48 is fulcrumed at 51, its other end being loosely connected to the adjacent end of a companion lever 52 rockingly mounted at 53 and connected by a link 54 to the rear wall of the wafer can 28.

On the other hand lever 49 is fulcrumed at 55 and has one end connected by a link 56 to the back wall of the other wafer container 29.

Thus the revolving cam 47 through the lever connections specified acts to raise and lower the cans to effect the discharge of their wafers from their lower ends.

Shaft 42 is equipped with a gear 57 in mesh with a pinion 58 on a shaft 59 provided with a crank 61 connected by a link 62 to a lever or rock arm 63 fulcrumed at 64 on a frame 65 in which the two wafer cans are vertically slidable, the lower ends of such cans being mounted for upright reciprocation in a similar lower frame 66.

Figure 4:
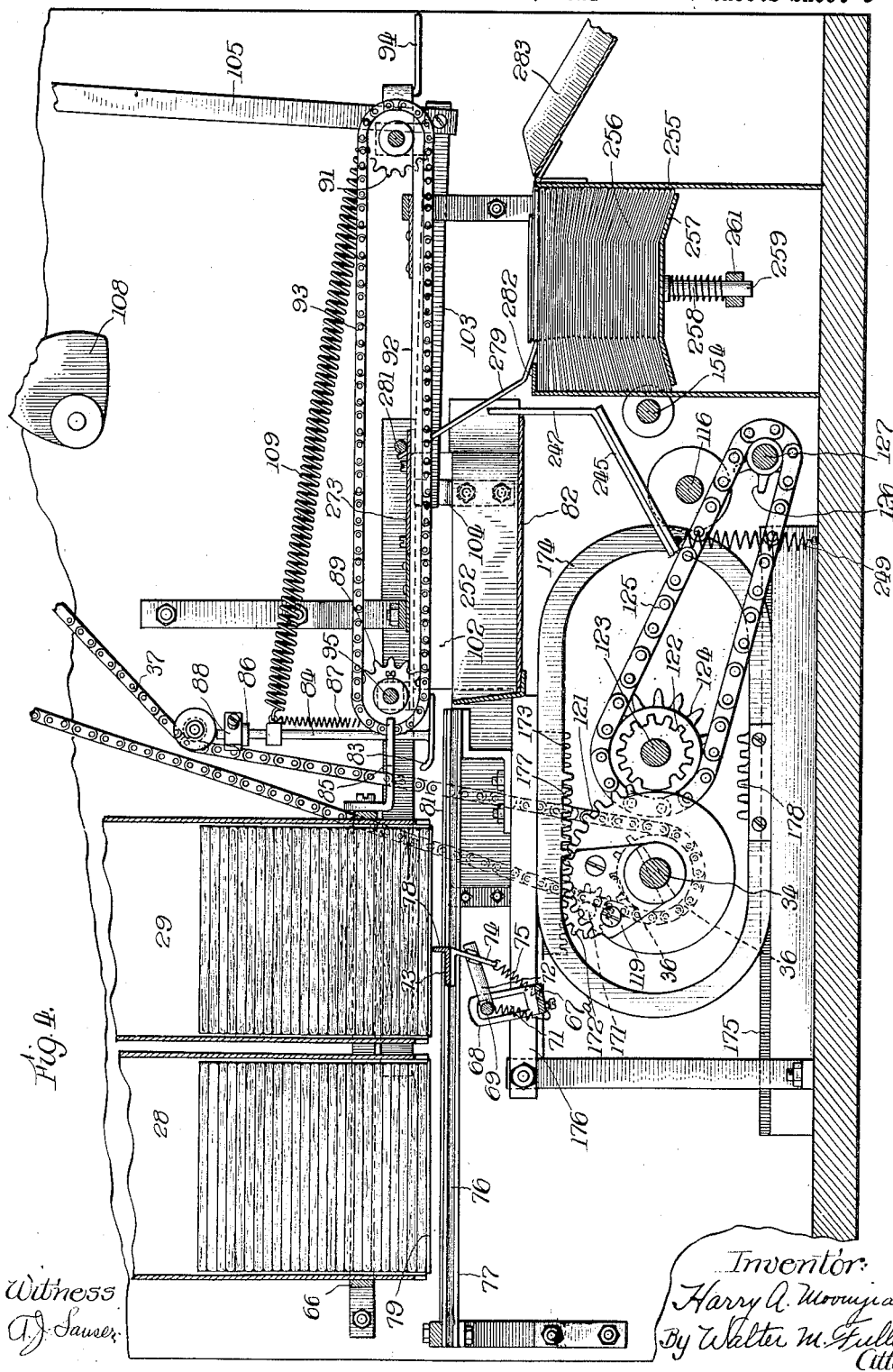
Figure 4 is an enlarged detailed cross-section on substantially line 4—4 of Figure 1, the parts being viewed in the direction indicated by the arrows.

Arm or lever 63, as is shown in Figure 4, has an inturned part 67 terminating in a slotted upwardly-extended end portion 68. Loosely pivoted or journalled in the arm 63 is a shaft 69 occupying the slot of the member 68 and normally pulled downwardly by a coil contractile spring 71. Shaft 69 at its inner end has a laterally extended arm 72 rockingly engaging a slide 73 by means of a downwardly extended lug 74 connected to the part 67 by a coil spring 75.

The slide 73 is mounted for reciprocation in guideways 76 in two parallel bars 77 located beneath the wafer cans. Slide 73 has an upstanding finger 78 adapted to engage the rear edge of the lowermost wafer in the can which happens to be depressed during its forward movement, such lower wafer being supported on ledges 79 along the sides of the bottom of the can, the other wafers of such supply resting on the lowermost one, as will be readily understood.

As the finger 78 travels to the right as the parts are viewed in Figure 4 pushing a wafer in front of it along spaced supporting plates 81 between which the finger travels, such wafer is delivered to a suitably supported assembly platform 82 at a lower elevation than the wafer supporting elements 81.

To assure that the wafer will be deposited horizontally on such assembly platform or on a layer of ice cream thereon, the appliance is provided with two vertically-sliding horizontally-arranged shoes 83, each being mounted on the lower end of a rod 84 slidable in holes in suitable brackets 85 and 86 and normally pulled down by a coil spring 87 connected thereto, the descent being limited by a stop collar 88 fastened to the upper end of the rod and adapted to rest on the top face of bracket 86 but subject to being raised therefrom when a wafer passes under and slightly lifts the shoe.

A pair of sprocket-wheels 89 and 91 are revolubly mounted in suitable bearings on a properly-supported secondary frame 92, such sprocket-wheels being supplied with a sprocket-chain 93 equipped with a sandwich-feeder 94 outstanding from the chain equipped at its ends with lugs travelling in grooves of frame 92 and adapted as explained hereinafter to engage the rear face of the complete sandwich after it has been formed and cause the registration or alignment of its three superposed parts.

In order to actuate such chain and its feeding member, the following cooperating instrumentalities are provided which move in proper timed relation to the actuation of the other parts of the mechanism.

The shaft 95 on which the sprocket-wheel 89 is mounted is equipped with a sprocket-wheel 96 (Figure 3) with which a sprocket-chain 97 coacts, such chain passing around a driving sprocket-wheel 98 on drive-shaft 34, whereby the rotation of such shaft brought about by the electric-motor is transmitted to the sprocket-chain 93 and its feeding element 94.
The operating means for feeding and delivering the wafers is so constructed that the wafers are removed or discharged alternatively from the two cans so that their supplies will be decreased or depleted substantially uniformly. Whenever any particular sandwich is to be formed, the lowermost wafer thereof will have been fed into place on the preceding actuation of the mechanism and the operation of the appliance for the completion of such sandwich will also feed into place the initial wafer for the next sandwich.

The ice cream, of course, is retained inside of the refrigerator compartment and a layer of the same, when required, is delivered to the assembly platform through a doorway, having a base-plate 101, normally closed by a suitably guided sliding door 102 shown in closed position in Figure 5. The door is shifted back and forth in proper guideways by means of a link 103 pivoted at one end of a bracket 104 fastened to the door and pivoted at its other end to the lower portion of an arm 105 fulcrumed at 106 and actuated or rocked by a suitably guided sliding rod 107 bearing at one end against the arm or lever and at its other end on the edge of a cam 108 fastened to shaft 44, the latter being rotated through the action of sprocket chain 37 which turns the sprocket wheel 43. The door is normally held closed by the action of the cam and is automatically opened when permitted by the cam by a coil contractile spring 109 connected to the arm 105 and to any suitable stationary support.

Thus at the proper moment the door automatically opens and a layer of ice cream is pushed through the doorway on to the wafer resting on the assembly platform, whereupon the door at once closes so that the refrigerator may operate efficiently to maintain the ice cream therein at an appropriate low temperature.

Turning now to the means for cutting off the slices of ice cream and delivering them to the assembly platform, it will be observed that the bottom of each ice cream compartment is provided with a plate 111 (Figure 8) slidable in suitable guideways 112, 112, each member 111 constituting not only a closure for the bottom of its ice cream chamber but also a knife to shave off a slice of the ice cream, element 111 having a down-turned ear 113 by means of which it may be reciprocated.

The appliance is supplied with a traveling carriage which is fed along automatically to come under the cans in succession and also into register with the corresponding ears 113 of their slicing knives.

To this end the machine is provided with a carriage 114 (Figure 7) slidable on and guided by a pair of spaced tracks or rails 115, 115 on the floor of the compartment below the ice cream chambers in the refrigerator.

Such carriage is advanced intermittently to bring it into register with the various ice cream chambers by means of a screw threaded shaft 116 extended through a threaded portion 117 rigid with the carriage, whereby the turning of the screw shaft brings about the lengthwise travel of such carriage.

The unthreaded portion of such shaft 116, as shown in Figure 1, projects through the end wall of the refrigerator, being rotatably supported in a bearing 118.

It will be apparent that in order to feed the carriage back and forth below the ice cream compartments it is necessary to revolve such shaft at proper times in opposite directions.

To this end drive shaft 34 has two mutilated gears or sectors 119 and 121 fastened thereto side by side but out of register, the two combined constituting in effect a single sector with a number of teeth equal to the sum of the two.

These two sectors acting in effect as a single sector are adapted to coact with a gear 122, fixed on a shaft 123 and secured to a sprocket wheel 124 operating a sprocket chain 125 encircling a smaller sprocket wheel 126 fast on a shaft 127.

Such shaft is supplied with a beveled gear 128 meshing with a smaller beveled gear 129 on a shaft 131 connected to an upper shaft 132 through a suitable sprocket chain connection 133, such latter shaft having a beveled gear 134 in mesh with two beveled gears 135 and 136 free to turn on shaft 116, the latter being fitted with a double clutch collar 137 keyed to and slidable on the shaft so that it may be shifted to operative connection with clutch teeth on either of the gears 135 or 136, all of which is a usual construction.

When the element 137 is clutched to the gear 135 shaft 116 will be revolved in one direction, whereas when the element 137 is clutched to the other gear 136 the shaft will be rotated in the opposite direction.

To shift the clutch from the one into the other position the following cooperating elements have been provided.

Figure 3:
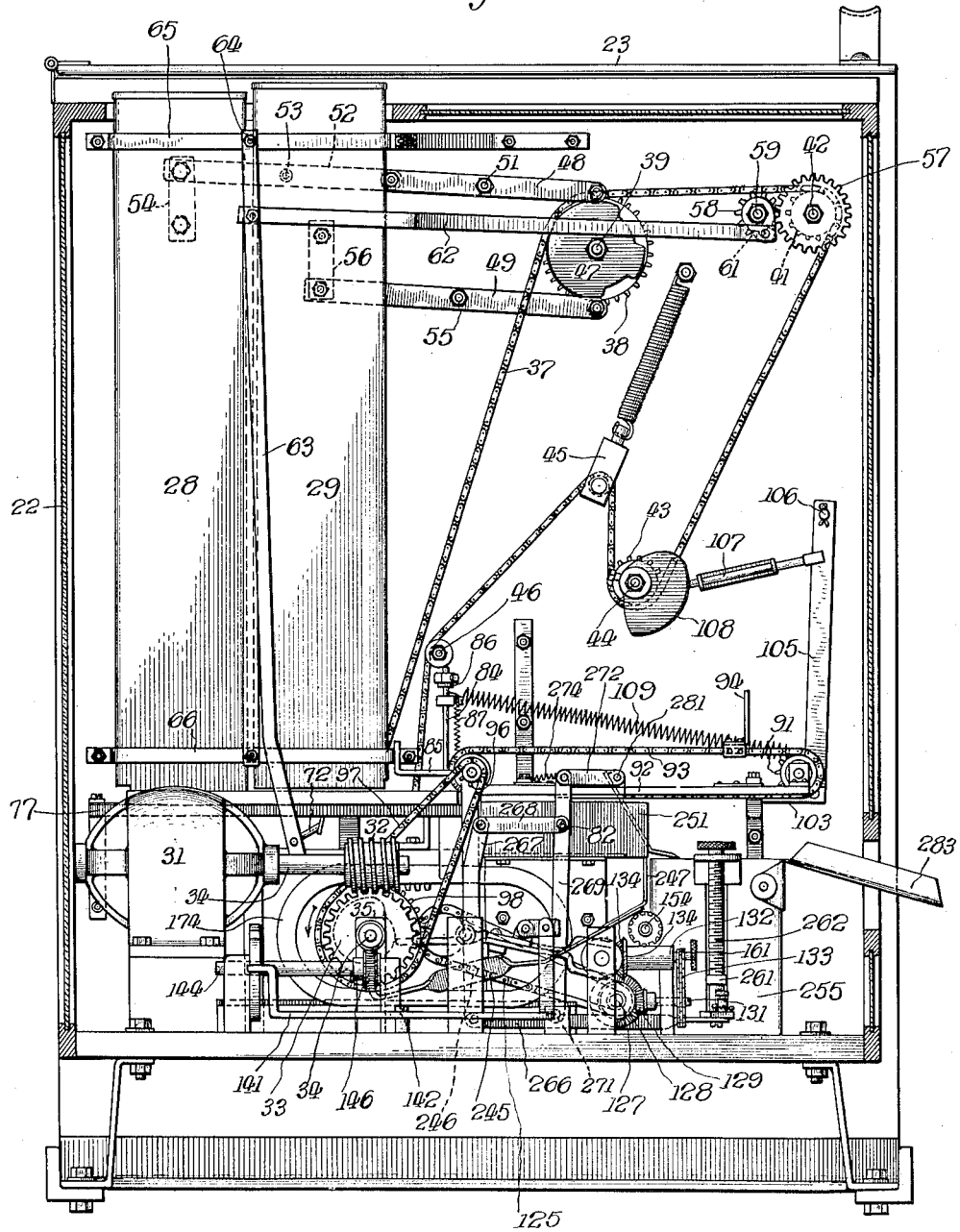
Figure 3 is an end elevation of a portion of the operating mechanism.

The clutch member 137 is connected in the usual pin and groove manner to a yoke arm 138 fulcrumed on a stationary support at 139 and operated by a bent lever 141 (Figure 1) rockingly mounted at 142 and oscillated by a cam 143 on a suitably supported shaft 144 rotated by the main drive shaft 34 through a worm 145 and a companion worm wheel 146 (see Figures 1 and 3).

The carriage 114 (Figure 7) is provided with a pillar 147 having a cylindrical cavity in its upper portion accommodating a cylindrical plunger or stem 148 carrying at its top a flat table 149 of a length substantially equal to the width of two ice cream cans, as illustrated. It is desired to raise and lower such table, whereby after the slab of ice cream has been severed from the supply while resting on the table the latter will be lowered slightly to facilitate the carrying away of such severed layer, that is to say, it drops slightly away from the knife which cut it off.

To accomplish this result and also to provide for adjustment, whereby the thickness of the layer may be varied at will, the following coacting parts have been provided.

Shaft 34 extends rearwardly through the insulated wall of the refrigerator into and almost the length of the compartment below the ice cream chamber. Carriage 114 has an upright slotted block 151 mounted thereon, the walls of which are apertured for the accommodation of shaft 34, the slot of such element 151 receiving the cam 152 (Figures 7 and 8) secured to but slidable on the shaft 34 whereby the cam travels with the carriage, the shaft having no lengthwise movements.

The cam is located below the offset end portion of a lever or arm 153 extended through a cavity in the post 147, beneath the stem 148 and pivoted on a shaft 154 extended through a block 155 mounted on and movable with the carriage.

Between the top edge of lever 153 and the lower end of shank or stem 148 a wedge 156 is positioned, whereby the rock arm or lever acts by reason of the turning of the cam to raise and lower the table 149 through the wedge 156.

The position of the lever may be varied to change the thickness of the slice of ice cream cut off, that is to say, to vary the position of the table on which the body of ice cream rests preliminary to its severance from the supply.

A rack 157 is slidable through the block 155 and teeth on its lower edge are in mesh with those of a gear 158 keyed to shaft 154, whereby turning of such shaft will vary the position of the wedge and thus modify the thickness of the ice cream layer to be produced.

Shaft 154 extends forwardly through the wall of the refrigerator, its protruding end being mounted in a convenient bearing 159 (Figure 5) and capable of being turned to secure such adjustment by means of a handle 161 operating a worm 162 in mesh with a worm wheel 163 fastened to the shaft.

It should be clear, therefore, that by merely turning the knob or handle 161 the thickness of the slice of ice cream cut off can be easily and readily controlled.

In order to hold the table down against the wedge and the arm against the cam, a coil contractile spring 164 (Figure 9) is connected at one end to the carriage and at the other end to the table.

Turning now to the mechanism which actually effects the slicing of the ice cream, it wil be observed that the carriage has a plate 165 mounted on the standard or post 147, and on top of such plate there are two oppositely-arranged sliding racks 166 and 167 (Figure 6) operatively connected together by an intermediate pinion 168 revolubly mounted on the plate and in mesh with the teeth of both racks.

It will be clear, from this construction, that both racks move inwardly and outwardly simultaneously.

To operate these racks, the one 167 is supplied with teeth on its lower edge which are in mesh with those of a gear 169 splined to a shaft 171, the gear being accommodated in a slot of a block 172 fastened to the carriage. It would be perceived by those skilled in the art, therefore, that the carriage may slide relatively to the shaft 171 but the gear and rack will be maintained always in operative relation and the gear will be rotated by shaft 171 whenever the latter is revolved.

Shaft 171 extends forwardly through the wall of the refrigerator, in front of which it is supplied with a pinion 172ª in mesh with the rack 173 fastened to and projecting rearwardly from the back face of a sliding rack member 174 guided in its reciprocations by tracks or rails 175 and 176, the one below the member, the other above it, as is clearly indicated in Figure 4. Internally such element 174 has a rack 177 in register with sector 121 and secured to its front is another rack 178 in register with sector 119.

The rack 167 has an upstanding projection or ear 179 adapted by the travel of the carriage to be brought into register and cooperative relation with the knives or bottom closures of the several ice cream compartments of one of the rows, the groove of such member being designed to receive the downturned part 113 of the particular knife with which the rack is in register.

The opposite end of the companion rack 166 is fitted with a like grooved outstanding projection 181 adapted to be shifted into cooperative relation with the ears or tabs of the knives of the ice cream chambers of the other row.

These portions 113 of the several ice cream slicing knives are so arranged or offset, as is clearly shown in Figure 6, that when one of the members 179 or 181 is in active relation with one of the knives the other element will be out of register with all other knives, wherefore the appliance can shave off a layer of ice cream from one compartment only at a time and the carriage must be shifted somewhat in order to effect the slicing off of the ice cream of the next can.

Figure 2:
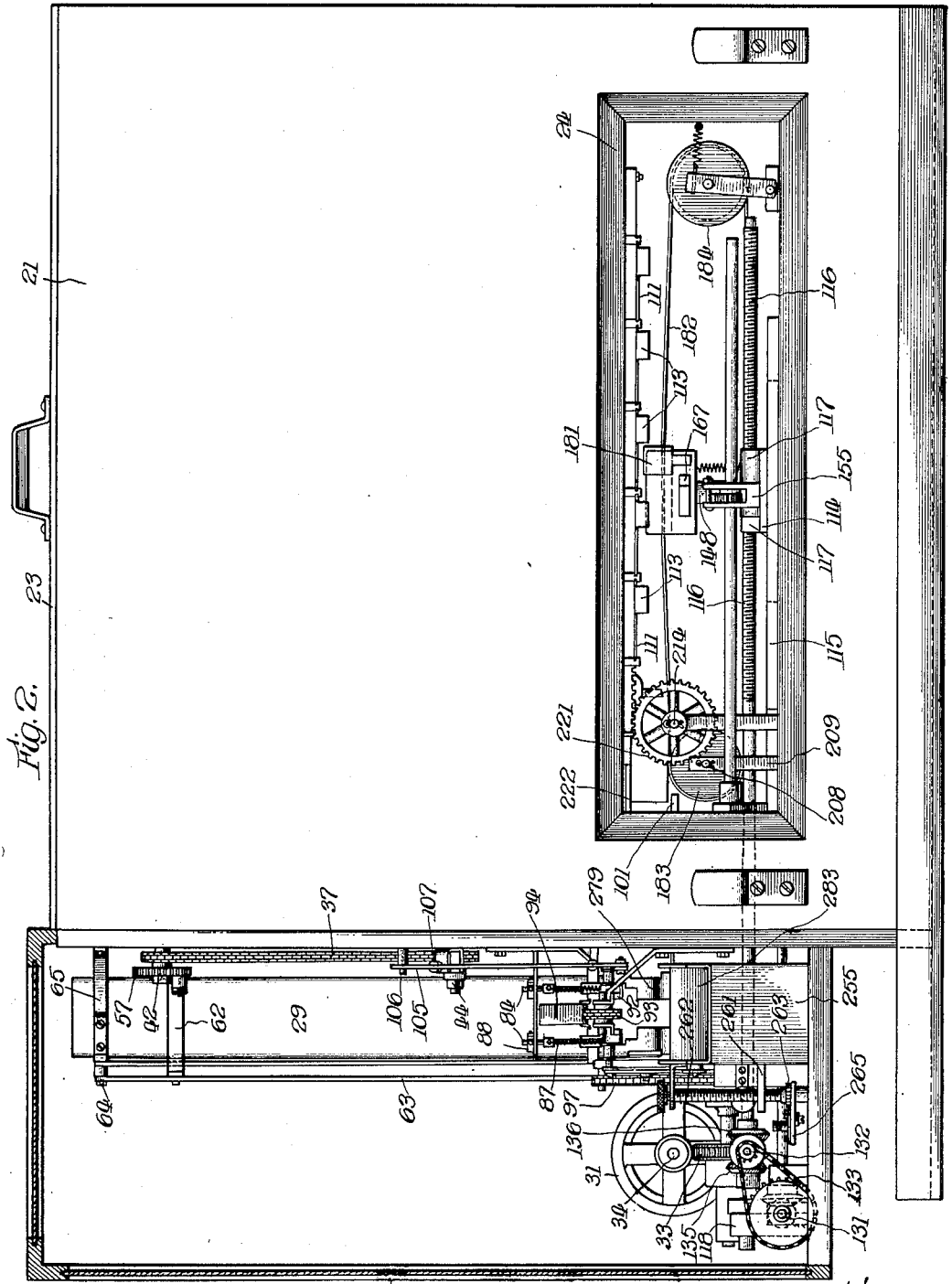
Figure 2 is a side elevation of the structure with the casing in section.

As is illustrated in Figure 2, an endless metal belt 182, passing around a driving drum 183 and around a spring actuated tightening drum 184, is located directly beneath the row of ice cream containers 27, the upper stretch or length of such member 182 resting on and passing over the table 149.

When, therefore, a slice of ice cream is cut off of the contents of any of the cans of row 27, it will be deposited directly upon such belt conveyer 182, but if the ice cream is sliced off of the contents of one of the cans 26 it will rest directly upon the table 149 and consequently means must be provided for shifting it over on to the belt at the proper time.

To this end the following coacting elements are provided: A pusher or feeder 185 is mounted on the end of a rod 186 pivotally connected at its other end at 187 to an upturned finger 188 of a slide bar 189 parallel to the rack 167 and spring actuated in a direction to carry the pusher 185 toward the endless conveyer by a coil spring 191 bearing at one end against a bearing 192 through which the rod slides, the other end of the spring pressing against a collar 193 at the other end of the rod. Such rod is adapted to be forced to the left as the parts are viewed in Figures 6 and 7 by means of a bent bar 194 overlying the end of the bar 189 and fastened to and movable with the rack 167.

It should be apparent, therefore, that as rack 167 moves to the left the bar 189 and the pusher 185 are carried in a like direction by reason of the presence of the element 194 on the rack.

To temporarily maintain the ice cream feeder or pusher 185 in retracted position the following elements are supplied in the mechanism. A pin 195 (Figure 9) secured in the bar 189 projects down from the latter into a slot 196 in and disposed lengthwise of the plate 165, as shown in Figure 10. A plate or lock 197 (Figures 6 and 9) is fulcrumed on top of the plate 165 on the pivot pin 198 (Figure 6) whereby the free end of the plate may be rocked into and out of the straight path of travel of the depending pin 195. In order to effect such movement of the element 197, a rod 199 is rockingly mounted in an upright position at 201 in the carriage 114, the upper end of such rod extending up through a transverse slot 202 (Figures 9 and 10) in the plate 165 and a hole in the pivoted lock 197, the member 199 being yieldingly pulled toward the bar 189 by a suitable coil contractile spring 203 fastened thereto and to a member 204 projecting down from the bottom of plate 165. In the plane of rod 199 the pivoted arm 153 is provided with a cam member 205 and coacting with this is another cam member 206 secured to the rod, the contacting or bearing surfaces of such cam elements being rounded or beveled off, as is clearly shown in Figure 9.

It will be seen that when the arm 153 is in its lowered position the cam members will force the rod 199 over freeing the lock 197 from the pin 195, permitting the rod 189 to respond to the expanding action of spring 191, thereby causing the travel of the pusher 185 toward the conveyer belt 182, in this manner shifting the slab of ice cream on the table on to such belt. When, however, the arm or lever 153 is in elevated position the lock 197 will swing over to engage the pin 195 and temporarily lock the ice cream feeder or pusher 185 in retracted position.

In order to prevent the slab of ice cream from becoming displaced on the table 149, plate 165 is provided with three upstanding retainer plates 207, 207 extended above the surface of the table. By means of this construction the pusher 185 feeds the layer of ice cream between such plates to the belt.

Turning now to the mechanism for intermittently actuating the endless belt conveyer, it will be seen that drum or pulley 183 is mounted on a shaft 208 revoluble in suitable bearings 209 and 210 of a fitting framework 211 located just inside of the refrigerator wall in the space between the ice cream compartments.

Shaft 123 previously described and shown in Figure 4, extends inwardly through the wall of the refrigerator and in the compartment beneath the ice cream chambers it is provided with a spiral gear 212 (Figure 11) in mesh with another spiral gear 213 fastened to shaft 208.

Inasmuch as shaft 123 is intermittently rotated by reason of the periodical engagement of the sectors 119 and 121 with the gear 122, the belt conveyer 182 will be correspondingly actuated.

The slice of ice cream having been deposited on the endless belt 182 directly or through the operation of the feeder 185, it is carried along on such belt and automatically delivered on the plate or platform 101 on the bottom of the opening through the wall of the refrigerator. It rests upon such member 101 until the next actuation of the machine, and inasmuch as it is inside of the refrigerator and the door 102 is closed, there is no danger of its melting before delivery. Stated somewhat otherwise, when the machine is actuated as by the insertion of a coin in a coin controlled mechanism, the previously cut slice of ice cream is employed for forming the particular sandwich, the mechanism slicing off another layer of ice cream and bringing it forwardly for use in the next sandwich, such slice in the meantime resting on the plate 101.

It is, of course, necessary to provide some form of mechanism which will deliver the slice of ice cream on the plate 101 after the door 102 has opened on to the assembly platform 82 and this should occur shortly after the machine has been put into operation.

Accordingly the following coordinated elements have been supplied to perform this function.

A shaft 214 (Figure 11) suitably journalled in the frame 211 is rotated by an inclined shaft 215 connected thereto by a universal-joint 216, shaft 215 being driven from shaft 171 by a pair of intermeshing spiral gears 217 and 218. The upper portion of shaft 215 is revoluble in bearing 219 on the top of a post or standard 220.

Shaft 214 is equipped with a gear 221, the teeth of which are in mesh with those on the under side of a suitably guided sliding rack 222 provided with a block 223 secured to one side thereof and on the under side of which a push bar 224 is pivoted or hinged at 225, the pivot or hinge pin being surrounded by a torsion spring 226 connected to the element 223 and 224 whereby the pusher tends to swing it into position at right angles to the rack, such rocking movement of the pusher being limited by a rod 227 outstanding from the block 223 with which a vertical pin 228 on the pusher is adapted to engage. It should be obvious, therefore, that as the rack and its outstanding pusher travel forwardly by reason of the rotation of gear 221, the pusher will engage the rear face of the layer of ice cream on the plate 101 and will feed it forwardly through the doorway on to the wafer resting on the assembly platform 82.

In order that such pusher may not be in the way of the next oncoming slab of ice cream on the belt, a mechanism is provided for temporarily holding such pusher retracted out of the way of the path of travel of such piece of ice cream and these parts will now be described.

A sliding lock-plate 229 (Figure 5) is provided with a downturned flange 231 which is in front of the pin 228 when the lock is in the position shown in Figure 5, but the lock may be moved to the left sufficiently to release the pusher 224 whereupon it will automatically swing into the dotted line position with its pin 228 bearing against the stop rod 227. Such element 229 is operated by an arm 232 having a loose connection therewith, pivoted at 233, and normally pulled into pusher locking position by a coil spring 234. It is adapted to be swung in the opposite direction by an electro-magnet 235 acting on an armature 236 carried by the arm. The magnet is energized at the proper moment by closing its electrical circuit by a collar 237 (Figure 5) on shaft 34 carrying a contact 238 adapted during the rotation of the shaft to engage a companion spring contact 239. The manner in which this is accomplished will be readily understood although the details of the electric circuit have not been illustrated and need not be described.

Associated with the lock member 229 is a guide arm 241 fulcrumed at 242 adjacent to the lock plate and normally pulled by a spring 243 into the oblique position shown in Figure 5 against the stop or abutment pin 244.

Prior to the beginning of the forward movement of the rack, the magnet is momentarily energized by reason of the contacts 238 and 239 temporarily engaging one another. The magnet attracts its armature 236 rocking the arm 232 against the action of spring 234 to slide the lock 229, thereby releasing the pusher 224, which automatically swings out into a position at right angles to the rack. Then during the forward movement of the rack and pusher the pin 228 of the latter engages the rear edge of the guide 241 and swings it out of the way, the latter rocking back automatically against its stop 244 as soon as the pin 228 has passed by. Continued forward travel of the pusher effects the discharge of the layer of ice cream from the plate 101 through the doorway and its delivery on to the wafer resting on the platform 82.

As soon as the magnet is de-energized, the lock 229 at once slides back to operative position and during the rearward travel of the rack and pusher the pin 228 engages the front edge of the guide-bar 241 whereby during continued rearward travel of the rack the pusher is automatically swung around and the pin ultimately passes back of the locking flange 231 which maintains it in retracted or inoperative position until the pusher is again released in the manner described.

It is to be noted that all of the parts above the conveyer belt 182 with the exception of the pusher are sufficiently elevated above such member so that the slice of ice cream may pass beneath them without conflict therewith.

It is desirable in an appliance of this kind to provide means not only for feeding the parts of the sandwich in superposed relation but also to register them correctly with one another. To this end a lever 245 is fulcrumed on a suitable support at 246, the upturned end 247 of such lever being employed when above the registration platform as a gauge or guide for the front edges of the wafers and intermediate slice of ice cream. Such lever is rocked by means of a cam 248 on shaft 34 which cooperates with the other end of the lever, as will be readily understood. In order to secure a prompt action of the lever and to maintain its ends in proper and firm engagement with the edge of the cam, it is supplied with a coil contractile spring 249 (Figure 4) arranged to pull downwardly on the longer arm of the lever. When the part 247 is elevated it acts as a gauge against which the elements of the sandwich are fed by the member 94, and as soon as such registration or alignment is secured the lever 245 swings quickly downwardly so that the sandwich may continue its forward movement under the pushing action of the feeder 94.

At its outer edge the registration platform 82 is provided with a stationary upstanding guide wall 251 but the corresponding inner or rear wall 252, which has a forward curved portion, is mounted on and slides with the door 102.

In order to afford adequate insulation for the refrigerator when such door 102 is closed, the inner face is provided with a heat insulated member 253 adapted to extend across the doorway in the closed position of the door and to occupy a recess 254 in the wall of the refrigerator when the door is open, all as is clearly shown in Figure 5.

As is depicted in Figure 4, the machine includes a compartment 255 containing a stack or pile of paper envelopes, bags, or similar receptacles desirably open at one end only. This stack of paper members 256, preferably waxed to render them moisture-proof, rests on a support 257 arched somewhat upwardly and spring pressed up by a coil spring 258 surrounding its depending stem 259 vertically slidable through an aperture in a bar 261 extended forwardly through a slot in the wall of the chamber 255 and fed upwardly step by step by a screw 262 passing through a threaded hole in the bar and turned intermittently through a ratchet wheel 263 (Figure 2) operated by a spring pressed pivoted pawl 264 on an arm 265 rockingly mounted on the lower end of the upright screw 262 and rocked or oscillated by means of a link 266 pivotally connected to the lower end of a lever 267 (Figure 3) fulcrumed intermediate its length. The top end of lever 267 is connected by a link 268 to an upright lever or arm 269 fulcrumed on the base at 271 and connected by a link 272 to a carriage 273 slidable on the frame 92 and normally retracted by a coil spring 274. Rock arm 269, and therefore the carriage 273 connected thereto, is operated by means of a cam 275 designed to slide a reciprocatory rod 276 equipped with a laterally extended pin 277 bearing on arm 269 and maintained horizontal by a spring 278.

At its forward end the slide or carriage 273 is provided with a pair of spaced bent envelope openers 279 rockingly mounted on a supporting cross-shaft 281 on the carriage, the lower ends of such members 279 normally resting on an inturned flange 282 at the top of the envelope chamber 255 against which a portion, that is to say the flap, of the topmost envelope of the stack bears, the fingers 279 during their travel to the right, as the parts are viewed in Figure 4, being adapted to extend part way into the envelope to assist in guiding the sandwich thereinto.

At the other end or side of the envelope magazine 255 is an inclined chute 283 down which the sandwich encased in the envelope is delivered to the customer.

The operation of the machine occurs practically as follows:

Assuming, for example, that it is actuated intermittently to supply sandwiches from time to time to meet a variable demand, and assuming that during the preceding operation of the mechanism a wafer has been delivered on the assembly platform 82 and a slice of ice-cream is resting on the plate 101, and that the refrigerator door 102 and its insulated member 253 are in closed position, when the machine is started the electromagnet 235 is momentarily energized by reason of the closing of the contacts 238 and 239, whereupon the magnet attracts its armature 236 rocking arm 232, thereby shifting lock 229 and releasing the ice cream feeder 224, which immediately swings into a position at right angles to its rack 222, being maintained in such relation by reason of the engagement of its pin with the stop rod 227.

The rotation of gear 221 causes the forward travel of the rack 222 and the feeder 224, the pin of the pusher for a short time swinging the guide arm 241 out of the way to permit its passing thereby and during the continued travel of these parts the pusher feeds the slab of ice cream on the plate 101 through the now open doorway, the door having opened shortly after the energization of the electro-magnet, on to the wafer resting on the platform 82, these two elements of the sandwich being brought into proper register or alignment with one another by being fed by such pusher against the wall 251.

After the layer of ice cream has thus been properly delivered on to the wafer on the platform the door quickly closes to conserve the cooling action of the refrigerator and remains closed during the further operation of the machine.

During the rearward travel of rack 222, the upstanding pin 228 of the pusher engages the edge of guide bar 241 and travels along such edge, being guided thereby to a position back of the lock 229, the latter under the action of spring 234 having returned to operative position as soon as the magnet was deenergized, which occurred shortly after the unlocking of the pusher. Such pusher occupies the position shown in Figure 5 when the rack has moved back to its initial position so that there is nothing in the way to prevent the unhampered feeding of the next layer of ice cream on to the plate 101.

During the first quarter period of the operation of the machine the wafer feeder 78 is moving rearwardly, during which time both of the wafer compartments 28 and 29 are maintained elevated by reason of the shape and rotation of their controlling cam 47. During the next quarter period the feeder 78 travels forwardly and also during such period one of the wafer cans will be in lowered position as determined by the cam 47 and during this period the feeder 78 removes the lowermost wafer from such lowered can and delivers it beneath the shoes 83 in horizontal relation on top of the layer of ice cream on the assembly platform, this completing the feeding of the free elements, two wafers and one ice cream slab, constituting the entire sandwich.

Shortly afterward the traveling finger 94 engages the rear edges of all three elements of the sandwich and feeds them forwardly against the gauge 247 whereby the three parts of the sandwich are brought into complete and accurate register with one another whereupon the gauge 247 quickly drops out of the way, the continued movement of the finger 94 feeding the sandwich beneath the envelope or bag openers 279 into the bag, the sandwich itself lifting such openers as they travel forwardly by reason of the sliding of carriage 273 so that the sandwich is completely inserted in the envelope or bag and discharged down the chute 283, the openers 279 in the meantime having ceased their forward movement.

The envelope openers travel rearwardly, that is, away from the envelope, during the first half of the operation of the machine and slide forwardly during the last half operation of the machine, whereas the sandwich itself is carried forward during the last half of such operation substantially simultaneously with the corresponding movement of the envelope or bag openers.

During the third quarter of the actuation of the machine the wafer feeder 78 is moving rearwardly, and during the fourth quarter of the operation it is traveling forwardly delivering a wafer from the particular wafer can which is then in lowered position and feeding such wafer in a horizontal relation on to the delivery platform ready for the formation of the next sandwich. It will, of course, be understood that during each backward movement of the element 78 both wafer cans are up and the cam 47 may be shaped so that wafers are fed alternately from the two cans or in any other desired manner but preferably so that the supplies of wafers will be substantially simultaneously exhausted in the two supply compartments.

While all of this is occurring with respect to the sandwich which has just been considered, another slice of ice cream is being cut off and fed forwardly ready when required for delivery to form part of the next sandwich. In other words, it is fed so as to remain on the plate 101 ready for discharge through the doorway when the machine is next operated.

The ice cream carriage 114 is stationary during the first half of the actuation of the machine and moves to the next ice cream can during the last half of the operation of the mechanism.

Similarly the endless conveyer belt 182 is at rest during the first half period of the action of the machine and is traveling during the second half period.

During the first fifth of the time of the operation of the machine the ice cream table 149 is rising and maintains its elevated position during the next three-tenths of the operation of the machine.

During the first quarter of such period the two racks 166 and 167 are moving outwardly or away from the ice cream cans and during this quarter period the one or the other slotted projection 179 or 181, as the case may be, depending on which is in register with the down turned ear 113 of the combination closure and knife for the compartment, slides such member outwardly thereby removing the bottom from such particular ice cream can and as soon as such plate or knife has traveled its full distance, thereby completely opening the bottom of the can, the body of ice cream therein, by reason of its weight and, if necessary, supplemented by an additional weight placed upon its top, descends so that its bottom surface rests on the now elevated ice cream table 149.

During the second quarter period of the actuation of the machine, the two racks 166 and 167 slide toward the cans, and the one which is active slides the combined closure and knife 111 in its guideways so as to shear or cut off a layer or slab of ice cream, the thickness of which, of course, is determined by the position of the table 149.

During the remainder of the period of operation of the machine, the racks and ice cream compartment closers or knives remain stationary.

During the first quarter period, in which time the racks move outwardly, the ice cream pusher or feeder 185, by reason of its operative connection with the rack 167 heretofore described, is moved rearwardly and locked temporarily in such position, as will be understood from the description of the operation of these parts above set forth in detail.

During the second quarter period such ice cream feeder 185 remains locked in this retracted relation.

At the beginning of the second half period the ice cream table 149 is lowered away from the knife and maintains such lowered position during the remainder of the actuation of the appliance.

As soon as such lowering of the table takes place, the pusher or feeder 185 is released and it quickly slides the layer of ice cream over on to the endless conveyer belt 182, assuming, of course, that in the present case a slab of ice cream has been cut from the row of cans not under the belt. If the ice cream is severed from one of the cans over the belt the feeder 185 moves just the same but inoperatively because it has no ice cream to push or feed. During the remainder of the action of the machine the feeder 185 maintains its position as shown in Figure 6 ready to be again operated by the rack 167 when the proper time arrives.

The conveyer belt, of course, transports the layer of ice cream past the retracted pusher 224 on to the plate 101 behind the closed refrigerator door ready for ejection upon the next operation of the machine.

The ice cream carriage remains stationary during the first half period of action of the machine and then moves during the second half so as to come in proper register with the next can of the other row, it being understood that a slice of ice cream is shaved off of a can of one row and then off of the next can of the companion row, the slices being removed alternately from the two rows.

When the carriage reaches the endmost can of either row it cuts two slices of ice cream from the same in succession by reason of the shape of can 143 so that the contents of all of the cans will become depleted or exhausted at substantially the same time.

Those skilled in this art will understand that the invention is not limited and restricted to the precise and exact details of structure illustrated and described because these may be modified within comparatively wide limits without departure from the substance and essence of the invention and without the sacrifice of any of its substantial benefits and advantages.

I claim:

1. In an ice-cream sandwich making machine, the combination of a plurality of supplies of ice-cream, means to sever layers of ice-cream from said supplies in a manner to cause their depletion substantially simultaneously, a wafer supply, means to feed said layers of ice-cream, and means to feed said wafers, whereby the ice-cream and wafer elements of said sandwiches are assembled to form such sandwiches.

2. In an ice-cream sandwich making machine, the combination of a refrigerator, a plurality of supplies of wafers outside of said refrigerator, a sandwich assembly platform outside of said refrigerator, means to feed the wafers individually from said supply to said platform in a substantially horizontal direction and in a manner to cause their depletion substantially simultaneously, an ice-cream supply in said refrigerator, means to sever layers of ice-cream from said supply, and means to feed said layers of ice-cream to said platform in a substantially horizontal direction, whereby the sandwiches are formed by bringing for each first a wafer, then a slice of ice-cream and then a second wafer to said platform for assembly thereon.

3. In an ice-cream sandwich making machine, the combination of a plurality of supplies of ice-cream, means to sever layers of ice-cream from said supplies in a manner to cause their depletion substantially simultaneously, a plurality of wafer supplies, means to feed said wafers from said supplies in a manner to cause their depletion substantially simultaneously, and means to feed said layers of ice-cream to assemble them with the wafers, whereby the sandwiches are formed from said wafers and layers of ice-cream.

4. In an ice-cream sandwich making machine, the combination of a plurality of wafer supply compartments, a feeder for the wafers, means to shift said compartments into and out of operative relation with said feeder, an ice-cream supply, means to sever layers of ice-cream from said supply, and means to feed said layers of ice-cream, whereby said feeding means causes the assembly of the wafers and layers of ice-cream thereby forming the sandwiches.

5. In an ice-cream sandwich making machine, the combination of a plurality of supplies of ice-cream, means to sever layers of ice-cream from said supplies in a manner to cause their depletion substantially simultaneously, a plurality of wafer supply compartments, a feeder for the wafers, means to shift said compartments into and out of operative relation with said feeder, and means to feed said layers of ice-cream, whereby the sandwiches are formed by assembling said wafers and said layers of ice-cream.

6. In an ice-cream sandwich making machine, the combination of a refrigerator, a stationary assembly platform outside of said refrigerator, an ice-cream supply in said refrigerator, means to sever layers of ice-cream from said supply, means to feed said layers of ice-cream to the platform in a substantially horizontal direction, a wafer supply outside of said refrigerator, and means to feed the wafers to said platform in a substantially horizontal direction at substantially right angles to the feed of the ice-cream thereto.

7. In an ice-cream sandwich making machine, the combination of an assembly platform, a plurality of supplies of ice-cream, means to sever layers of said ice-cream from said supplies in a manner to cause their depletion substantially simultaneously, means to feed said layers of ice-cream to the assembly platform, a wafer supply, and means to feed the wafers from said supply to said platform in a direction at substantially right angles to the feed of the layers of ice-cream thereto.

8. In an ice-cream sandwich making machine, the combination of an assembly platform, a plurality of supplies of ice-cream, means to sever layers of ice-cream from said supplies in a manner to cause their depletion substantially simultaneously, means to feed said layers of ice-cream to said assembly platform, a plurality of wafer supplies, means to feed said wafers from said supplies in a manner to cause their depletion substantially simultaneously, the feeding of said wafers to said platform occuring in a direction substantially at right angles to the feed of the layers of ice-cream thereto.

9. In an ice-cream sandwich making machine of the character described, the combination of a plurality of open bottom cans adapted to contain supplies of ice-cream, a conveyer beneath some of said cans, means to sever layers of ice-cream from the supplies in said cans, and means to feed the layers from the cans not over the conveyer on to said conveyer.

10. In an ice-cream sandwich making machine of the character described, the combination of a plurality of cans adapted to contain supplies of ice-cream, a slicing knife for the bottom of each of said cans, a carriage adapted to travel beneath the cans, means on said carriage to operate said knives, means to reciprocate said carriage, a conveyer beneath some of said cans, and means to feed the layers of ice-cream from the cans not over the conveyer on to such conveyer.

11. In an ice-cream sandwich making machine, the combination of a compartment for the supply of ice-cream, means in said compartment to slice off layers from said ice-cream supply, a heat insulated door for a delivery opening in said compartment, a wafer supply, means to feed and assemble the wafers and a layer of ice-cream severed from such supply, the ice-cream layer passing through said opening for such assembly, and means to automatically operate said door to permit the discharge of the layer of ice-cream through said opening.

12. In an ice-cream sandwich making machine, the combination of a refrigerator, means to hold a plurality of supplies of wafers outside of said refrigerator, a sandwich assembly platform outside of said refrigerator, means to feed the wafers individually from said supplies to said platform in a manner to cause their depletion substantially simultaneously, means to hold an ice-cream supply in said refrigerator, means to sever layers of ice-cream from said supply, means to vary the thickness of the ice-cream layers, a refrigerator doorway and door, means to open and close said door, and means to feed said layers of ice-cream through the open doorway to said assembly platform, whereby the sandwiches are formed by bringing for each first a wafer, then a slice of ice-cream, and then a second wafer to said platform for assembly thereon.

13. In an ice-cream sandwich mkaing machine, the combination of means to sever layers of ice-cream from a plurality of supplies, means to feed such layers of ice-cream and wafers and assemble them, and a single means to vary the thickness of the ice-cream layers from said several supplies.

14. In an ice-cream sandwich making machine, a refrigerator, means in said refrigerator to hold an ice-cream supply, means in said refrigerator to sever layers of ice-cream from said supply, a door for said refrigerator through which the severed layers of ice-cream are adapted to pass, means to open and close said door, means to feed such layers of ice-cream and wafers and assemble them outside of the refrigerator, and means operable outside of said refrigerator to vary the thickness of the ice-cream layers.

15. In an ice-cream sandwich making machine, the combination of a plurality of supplies of ice-cream, a plurality of supplies of wafers, and means to assemble wafers and a layer of ice-cream including means to cut the layers of ice-cream successively from the supplies, and means to deliver the wafers successively from said supplies.

16. In an ice-cream sandwich making machine, the combination of a plurality of rows of supplies of ice-cream, means to cut layers of ice-cream from said supplies alternately from said rows, and means to deliver all of said layers to the same assembly point.

17. In an ice-cream sandwich making machine of the character described, the combination of a plurality of cans adapted to contain supplies of ice-cream, a knife for the bottom of each of said cans of a size to close the bottom of the can when not cutting, a carriage adapted to travel beneath the cans, means to operate said carriage, and means on said carriage adapted to operate said can knives in succession to sever layers of ice-cream.

18. In an ice-cream sandwich making machine of the character described, the combination of a plurality of cans adapted to contain supplies of ice-cream, a sliding knife for the bottom of each of said cans of a size to close the bottom of the can when not cutting, a carriage adapted to travel beneath the cans, means to reciprocate said carriage, and means on said carriage to operate said can knives in succession to sever layers of ice-cream.

19. In an ice-cream sandwich making machine, the combination of a supply of ice-cream, a supply of wafers, means to form ice-cream sandwiches from said supplies, a supply of flat bags, and means to open said bags and to insert each sandwich in one of said bags.

20. In an ice-cream sandwich making machine of the character described, the combination of means to feed and assemble the parts of a sandwich, means to open up a substantially flat paper container, means to insert the sandwich in the container, and means to deliver the container and its sandwich from the machine.

21. In an ice-cream sandwich making machine of the character described, the combination of means to form sandwiches successively including means to feed and assemble the parts thereof, means to open up the topmost substantially-flat paper container of a stack thereof, means to insert the sandwiches successively in such opened containers, means to feed the stack of containers upwardly to compensate for their removal, and means to deliver the containers and the sandwiches from the machine.

22. In an ice-cream sandwich making machine of the character described, the combination of a plurality of supplies of each of the two ingredients of the sandwich, means to form the sandwiches in succession including means to sever sections from one of said group of supplies in sequence, means to deliver the other elements of the sandwich in sequence from their plurality of supplies, and means to feed and assemble the parts of the sandwiches.

23. In an ice-cream sandwich making machine of the character described, the combination of a refrigerator provided with a door, means to open and close said door, an ice-cream supply chamber in said refrigerator, means inside said refrigerator to sever a single section of ice-cream at a time from the bottom of said supply and advance it to a position near said door, and means acting on the subsequent operation of the machine to deliver said section of ice-cream through said doorway.

24. In a machine of the character described, the combination of a refrigerator, a plurality of stationary compartments in said refrigerator adapted to contain supplies of an edible product, means for each supply inside of said refrigerator to cut off slices from such supply, means common to said supplies and operable from the outside of said refrigerator to vary the thickness of said slices, a refrigerator door, means to open and close said door and means to deliver said slices through the open doorway.

25. In a machine of the character described, the combination of a refrigerator, an ice-cream compartment in said refrigerator, means to sever slices of ice-cream from the supply in said compartment, an assembly platform outside of said refrigerator, a plurality of chambers adapted to accommodate wafers, means to feed the wafers to said platform, a door for said refrigerator, means to open and close said door, means to feed the slices of ice-cream to said platform, means to register the elements of the sandwich, means to accommodate a supply of covers for the sandwiches, means to insert the completed sandwiches in said covers.

26. In an appliance of the character described, the combination of a refrigerator, a door therefor, means to open and close said door, means in said refrigerator to hold a supply of ice-cream, means in said refrigerator to slice layers of ice-cream from said supply, an assembly-platform outside of said refrigerator, means to hold a supply of wafers, means to feed wafers from said supply to said platform, means to feed the slices of ice-cream through the open doorway to said platform, means to accomodate a supply of sandwich covers, and means to insert the completed sandwiches in said covers.

27. In an appliance of the character described, the combination of a refrigerator, a door therefor, means to open and close said door, means inside the refrigerator to hold a plurality of supplies of ice-cream, means in said refrigerator to slice layers of ice-cream from said supplies in a manner to cause their substantially simultaneous depletion, an assembly platform outside of said refrigerator, means outside of said refrigerator to hold a supply of wafers, means to feed wafers from said supply to said platform, means to feed the slices of ice-cream through the open doorway to said platform, means to accommodate, a supply of sandwich covers, and means to insert the completed sandwich in said covers.

28. In an appliance of the character described, the combination of a refrigerator, a door therefor, means to open and close said door, means in said refrigerator to hold a plurality of supplies of ice-cream, means in said refrigerator to slice layers of ice-cream from said supplies in a manner to cause their substantially simultaneous depletion, means operable from the outside of said refrigerator common to ice-cream supplies to vary the thickness of the ice-cream slices, an assembly platform outside of said refrigerator, means to hold a supply of wafers, means to feed wafers from said supply to said platform, means to feed the slices of ice-cream through the open doorway to said platform for assembly thereon with the wafers, means to accommodate a supply of sandwich covers, and means to insert the completed sandwiches in said covers.

29. In an appliance of the character described, the combination of an assembly platform, means to feed wafers to said platform, means to feed slices of ice-cream to said platform and means to line up said wafers and slices of ice-cream after assembly to bring them into register.

30. In an appliance of the character described, the combination of a stationary assembly platform, means to accomodate a supply of wafers at one side of said platform, means to accomodate a supply of covers for the sandwiches at the opposite side of the platform, means to feed the wafers to said platform, means to feed slices of ice-cream to said platform for assembly with the wafers, and means to insert the completed sandwiches individually in said covers.

31. In an appliance of the character described, the combination of an assembly platform, means at one side of said platform for accommodating a supply of wafers, means at the opposite side of said platform for accommodating a supply of sandwich covers, means to feed wafers to said platform, means to feed slices of ice-cream to said platform at right angles to the travel of the wafers thereto, and means to insert the completed sandwiches individually in said covers.

32. In an appliance of the character described, the combination of a refrigerator, a door therefor, means inside of said refrigerator to hold a supply of ice-cream, means to slice layers of ice-cream from said supply, an assembly platform outside of said refrigerator next to said door, means to feed said slices of ice-cream through the doorway on to said platform, means on the wall of the refrigerator equipped with the door for accommodating a supply of wafers, means to feed wafers from said supply to said platform, means on the wall of the platform equipped with the door for holding a supply of covers for the sandwiches, and means to feed the complete sandwiches from said platform and insert them individually in said covers.

33. In an appliance of the character described, the combination of a chamber adapted to contain ice-cream, means to accommodate a supply of wafers, an assembly-platform, means to feed wafers to said platform, means to sever slices of ice-cream from said supply, and means to feed such ice-cream slices to said platform for assembly with said wafers, said ice-cream severing means cutting off a layer of ice-cream, while the assembly of the parts of another sandwich is occuring on said platform.

HARRY A. MOOMJIAN.